US008611654B2

(12) United States Patent
Yadav

(10) Patent No.: US 8,611,654 B2
(45) Date of Patent: Dec. 17, 2013

(54) COLOR SATURATION-MODULATED BLENDING OF EXPOSURE-BRACKETED IMAGES

(75) Inventor: Vikas Yadav, Noida (IN)

(73) Assignee: Adobe Systems Incorporated, San Jose, CA (US)

(*) Notice: Subject to any disclaimer, the term of this patent is extended or adjusted under 35 U.S.C. 154(b) by 736 days.

(21) Appl. No.: 12/652,644

(22) Filed: Jan. 5, 2010

(65) Prior Publication Data
US 2013/0094758 A1    Apr. 18, 2013

(51) Int. Cl.
G06K 9/00 (2006.01)
H04N 9/68 (2006.01)
G03F 3/08 (2006.01)
G03B 7/00 (2006.01)
G03B 41/00 (2006.01)

(52) U.S. Cl.
USPC ........... 382/167; 348/645; 358/520; 396/222; 396/322

(58) Field of Classification Search
None
See application file for complete search history.

(56) References Cited

U.S. PATENT DOCUMENTS

| 5,828,793 | A | 10/1998 | Mann |
| 6,781,591 | B2 | 8/2004 | Raskar |
| 6,868,179 | B2 | 3/2005 | Gruzdev et al. |
| 7,142,723 | B2 | 11/2006 | Kang et al. |
| 7,239,805 | B2 | 7/2007 | Uyttendaele et al. |
| 7,272,265 | B2 | 9/2007 | Kouri et al. |
| 7,602,406 | B2 | 10/2009 | Gray, III et al. |
| 7,623,683 | B2 | 11/2009 | Chen et al. |
| 7,646,400 | B2 | 1/2010 | Liow et al. |
| 7,680,359 | B2 | 3/2010 | Castorina et al. |
| 7,778,487 | B2 | 8/2010 | Cohen et al. |
| 7,778,491 | B2 | 8/2010 | Steedly et al. |
| 7,796,812 | B2 | 9/2010 | Pitie et al. |
| 7,839,422 | B2 | 11/2010 | Agarwala |
| 7,844,133 | B2 | 11/2010 | Spence et al. |
| 8,189,959 | B2 | 5/2012 | Szeliski et al. |
| 2003/0043390 | A1 | 3/2003 | Fritz et al. |
| 2004/0013298 | A1* | 1/2004 | Choe et al. ................. 382/167 |
| 2005/0074179 | A1 | 4/2005 | Wilensky |
| 2005/0219264 | A1 | 10/2005 | Shum et al. |

(Continued)

OTHER PUBLICATIONS

Mertens et al., "Exposure Fusion: A Simple and Practical Alternative to High Dynamic Range Photography", Computer Graphics, 2009, vol. 28, No. 1, pp. 161-171.*

(Continued)

Primary Examiner — Amir Alavi
Assistant Examiner — Kenny Cese
(74) Attorney, Agent, or Firm — Finch & Maloney PLLC

(57) ABSTRACT

Systems and methods are presented for generating a new digital output image by blending a plurality of digital input images capturing the same scene at different levels of exposure. Each new pixel for the new digital output image is derived from a group of corresponding aligned pixels from the digital input images. For each group of corresponding pixels from the digital input images, an average color value in a first color space is derived by taking a separate average across each color channel of the first color space. The resulting average color value in the first color space is modified in order to raise its corresponding color saturation value in a second color space. The new pixel's color value in the first color space is set to the modified average color value.

16 Claims, 9 Drawing Sheets

(56) References Cited

U.S. PATENT DOCUMENTS

| | | | |
|---|---|---|---|
| 2006/0109284 A1 | 5/2006 | Hsieh et al. | |
| 2006/0239579 A1 | 10/2006 | Ritter | |
| 2006/0262363 A1* | 11/2006 | Henley | 358/516 |
| 2007/0071341 A1 | 3/2007 | Pfister | |
| 2007/0103483 A1 | 5/2007 | Glen | |
| 2008/0297596 A1* | 12/2008 | Inomata et al. | 348/80 |

OTHER PUBLICATIONS

David W. Viljoen, et al., "Saturation and Value Modulation (SVM): A New Method for Integrating Color and Grayscale Imagery," 2007, 14 pages.

Gradient domain Image Blending—Devices, Xiong et al., IFCS-SITE, 2010, pp. 293-306.

* cited by examiner

COLOR SATURATION-MODULATED BLENDING OF EXPOSURE-BRACKETED IMAGES

BACKGROUND

Photographic and image processing methods sometimes involve capturing multiple images of the same scene at varying levels of exposure, a technique known as exposure bracketing. High-contrast scenes can cause problems for cameras, which may not be capable of capturing as wide a dynamic range of light and dark within a scene as the human eye is able to perceive. A single camera image taken at a middle exposure might record a scene with bright regions appearing nearly white, or dark regions nearly black. By taking a series of images of the same scene across a range of exposure levels, a camera can correctly capture bright parts of the scene in some of the images, and dark parts in others of the images. Computerized digital imagery functions can extract information contained within the series of images, analyze the extracted information, and then manipulate the data held in the entire series of images to produce a new image that captures the original scene in fuller dynamic range than any of the original individual photographs. The resulting new image is a blended exposure gotten by merging some or all of the original photographs.

Current methods for managing and blending exposure-bracketing images of a scene can be slow, computationally expensive, complex, or ill-suited for non-professional equipment. For example, some high dynamic range (HDR) techniques may require using many bits per color channel, and thus may make large memory and processing demands. Algorithms for manipulating HDR data may be complex, and consequently computationally expensive. Workflows for executing such methods may be complicated enough to discourage non-professionals from using them. In some cases, current methods necessitate use of expensive, specialized monitors.

SUMMARY

The description herein discloses various embodiments of systems and methods for receiving and blending a plurality of digital input images of a same scene, where the digital input images comprise corresponding pixel arrays. The pixels within the several arrays may correspond geometrically with respect to the particular part of the single scene that each corresponding pixel represents. A color saturation-modulated blending technique is used for generating a new digital image by blending the received digital input images. Generating the new digital image includes calculating, for each pixel of the new digital image, a new color value in a first color space, where the first color space comprises separate color channels. For each given pixel of the new digital image, calculating the new color value in the first color space involves determining an average color value in the first color space based on averaging, independently for each of the separate color channels, color values of pixels in the corresponding pixel arrays that correspond to the given pixel of the new digital image. For each given pixel of the new digital image, calculating the new color value in the first color space further includes modifying the previously-calculated average color value in the first color space in order to increase its corresponding color saturation value in a second color space, based on a maximal color saturation value, in the second color space, of pixels in the corresponding pixel arrays that correspond to the given pixel of the new digital image. The resulting modified average color value is the new color value in the first color space for the given pixel of the new digital image.

According to various embodiments, color values in the first color space may be designated or represented by a vector or tuple of individual color coordinates for each of the separate color channels in the first color space. For example, for embodiments in which the first color space is a standard red-green-blue (RGB) additive color space, color values for pixels may be given as 3-tuples of the form (r,g,b), where r represents a color coordinate for the red color channel, g represents a color coordinate for the green color channel, and b represents a color coordinate for the blue color channel. According to some embodiments, the second color space may be an HSV (Hue, Saturation, Value) or HSL (Hue, Saturation, Lightness) color space in which the middle component represents the degree of color saturation. Such HSL and HSV color spaces may have a precisely defined relationship with corresponding RGB additive color spaces, so that color values (i.e., points, or tuples) in HSL or HSV color spaces may be readily converted to corresponding color values (points, tuples) in RGB space, and vice versa.

According to some embodiments, for a given pixel of the new digital image, the previously-calculated average color value in the first color space is modified such that conversion of the newly-modified average color value in the first color space into a corresponding color value in the second color space yields a point in the second color space whose color saturation component is equal to a maximal color saturation value, in the second color space, of those pixels in the corresponding pixel arrays that correspond to the given pixel of the new digital image.

According to numerous embodiments, a maximal color saturation value, in the second color space, of those pixels in the corresponding pixel arrays that correspond to a given pixel of the new digital image may be obtained by converting color values in the first color space to color saturation values in the second color space. For a given pixel of the new digital image, the color value of its corresponding pixel in each one of the corresponding pixel arrays is converted from the first color space to a second-color-space color value. In some embodiments, the first color space may be a standard RGB color space, and the second color space may be a standard HSV color space that has a well-defined relationship to its RGB counterpart. The HSV color values resulting from the conversion may then be evaluated to determine which ones represent maximal color values. For instance, one or more of the resulting HSV color values may have HSV color saturation coordinates which are not exceeded by the HSV color saturation coordinates of any of the other resulting HSV color values. The maximal color saturation value may then be set to a largest one of the resulting color saturation values in the second color space.

Following determination of a maximal color saturation value in the second color space, actual modification of the previously-calculated average color value in the first color space may involve a process of conversion and replacement, according to some embodiments. First, the previously-calculated average color value may be converted into a corresponding color value in the second color space. A color saturation component of the resulting corresponding color value in the second color space may then be replaced by the maximal color saturation value described above. Subsequent to the replacement of its color saturation component, the resulting corresponding color value in the second color space may be converted back into a corresponding first-color-space color value, yielding a revised first-color-space average color value which is different from the previously-calculated first-colorspace average color value, but whose corresponding hue (e.g., h component in HSV color space) and brightness (e.g., v component in HSV color space) in the second color space match the hue and brightness of the previously-calculated average color value when the latter is converted to second-color-space coordinates.

Generation of the new digital image as described in the foregoing paragraphs may, in some embodiments, be performed automatically in response to receiving input to select the plurality of digital input images. Subsequent to the generation of the new digital image, further input may be received to modify the selection of digital input images. For example, the further input may indicate a desire to remove one or several of the digital input images from the earlier selection, or may indicate a desire to add one or more digital input images that were not included in the earlier selection. In fact, the further input may add one or more digital input images that were not included in the earlier selection, while simultaneously removing one or several digital input images that were included in the earlier selection. In response to modifying the previous selection of digital input images, another new digital image may be automatically generated using the modified selection of digital input images.

Input to select the plurality of digital input images may, in some embodiments, be received via a user interface having representations of the plurality of digital input images which may be independently selected and deselected via the user interface. The new digital image generated by blending a selection of digital input images may be displayed within the user interface.

In certain embodiments, a memory is coupled to a processor, and the memory stores program instructions executable by the processor to implement an image blending module. In these embodiments, the functions described above may be performed by the image blending module. In some embodiments, the system may include a computer-readable storage medium storing program instructions that are computer-executable to perform these functions.

Figure 1:
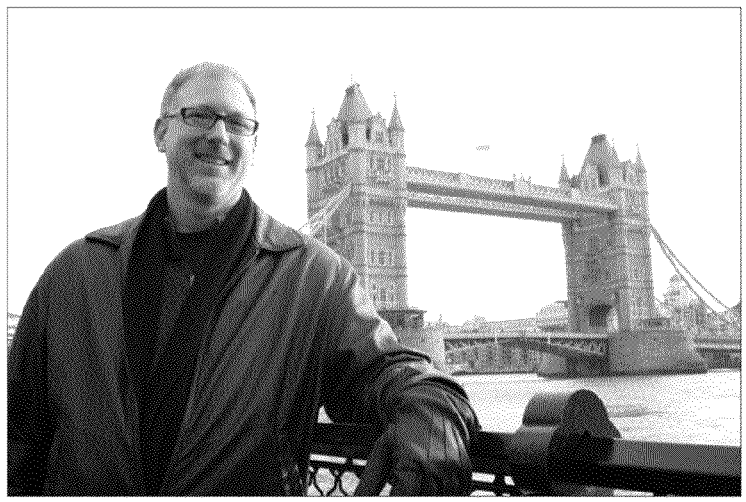
FIGS. 1-3 illustrate one embodiment of digital input images of the same scene, where the digital input images were captured at varying levels of exposure.

While the present disclosure is described herein by way of example for several embodiments and illustrative drawings, those skilled in the art will recognize that the disclosure is not limited to the embodiments or drawings described. It should be understood, that the drawings and detailed description thereto are not intended to limit the claims to the particular form disclosed, but that on the contrary, the intention is to cover modifications, equivalents and alternatives falling within the spirit and scope of the present disclosure as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the following detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is understood that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction

The following discussion explores various embodiments of systems and methods for processing a series of digital images of a single scene. The methods present a user interface that permits variable selection of several or all of the images in a collection of digital images of a single scene. In response to selection of several or all of the images in the collection of digital images of the single scene, the selected images may be automatically and immediately blended to create a new digital image, without requiring any user intervention. The user may be presented with an immediate display of the newly created image, also without user intervention. The user may then deselect some previously selected images, or select from the collection some images that are currently not selected, and again see an automatic and immediate display of a new digital image generated by blending the newly-selected images.

The discussion below describes internal algorithms that may be used to derive a color saturation-modulated blend of several currently-selected digital input images of a single scene. Some of the algorithms may be computationally inexpensive, and thus may be quickly executed. Such fast algorithms may allow users to see immediate visual results in response to selecting several of a series of exposure-bracketing digital input images of the single scene. The resulting color saturation-modulated blend of selected digital input images presents good contrast and sharpness, and natural, full color saturation.

Color Saturation-Modulated Blending of Digital Input Images

Figure 2:
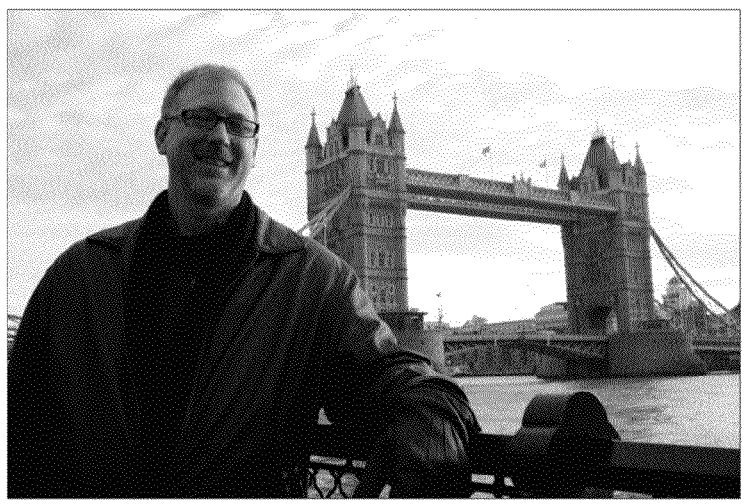
Figure 3:

Each of several differently-exposed digital images of a single scene may comprise a pixel array, and pixels from those pixel arrays may be grouped into tuples that each contain a single pixel from each of the pixel arrays, such that each pixel in any given tuple represents the same geometric portion of the single scene. In other words, when the several differently-exposed digital images of the single scene are geometrically aligned, they yield groups or tuples of mutually-aligned pixels. A single pixel in one of the pixel arrays may have a particular color value, while its corresponding single pixel from each of the other pixel arrays may have its own color value, which may or may not be the same as the particular color value, depending on the exposure level at which the digital images were taken. For example, FIGS. 1-3 show three different images of a single scene, each taken at a different exposure setting. The three exposure-bracketing images capture three sets of visual information about the single scene, and each of the three exposure-bracketing images stores its own captured set of visual information about the single scene in its own pixel array. In this embodiment, the three pixel arrays may coincide exactly, so that each pixel in one of the pixel arrays corresponds to exactly one pixel in each of the other two pixel arrays, thus yielding numerous 3-tuples of aligned pixels. In other embodiments, the pixel arrays for the several differently-exposed digital images of a single scene may only partially coincide. For example, if the camera moves slightly between takes of the several digital images, then there may be only a subarray of each of the original pixel arrays for the several differently-exposed digital images such that all the individual pixel subarrays of the original pixel arrays mutually coincide, pixel-for-pixel. For some embodiments in which the pixel arrays for the several differently-exposed digital images of a single scene only partially coincide, the systems and methods described below may operate only on the pixels that belong to the coincident subarrays. The term array as used herein is broadly construed to include one-dimensional vectors or tuples, 2-dimensional grids or matrices, tables, lists, search trees, or any other data structures used to store pixel data for the digital input images.

Figure 4:
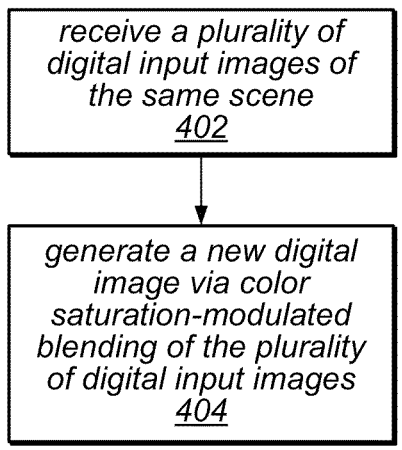
FIG. 4 is a flow diagram illustrating an embodiment of color saturation-modulated blending of the multiple digital input images, including receiving multiple digital input images of the same scene, and in response, generating a new digital image.

The flow diagram in FIG. 4 illustrates two main stages for color saturation-modulated blending of the multiple digital input images, according to various embodiments. In these embodiments, an image blending module of a computing system (FIG. 12, element 1225) may, at the first stage, receive a plurality of digital input images of the same scene (FIG. 4, 402). As described in the introductory paragraphs above, the received digital input images may have been captured at different exposure settings, so that they represent the same scene taken a varying levels of exposure. The received digital input images may be part of a collection of many images taken of a single scene in order to form an exposure-bracketing set. The information contained collectively within the entire set of exposure-bracketing digital images may be extracted and analyzed, and then manipulated by an image-blending mechanism, such as image blending module 1225 in FIG. 12, to produce a new digital image that captures the original scene in fuller dynamic range than does any individual one of the multiple digital input images.

The second main stage illustrated in FIG. 4 is for generating a new digital image by means of color saturation-modulated blending of a selected multiplicity of the received digital input images (FIG. 4, 404), a process that operates on a pixel-by-pixel basis. For example, a new digital image may be formed by blending all three of the images shown in FIGS. 1-3, where each of the images was taken at a different exposure level. Each of the three exposure-bracketing images shown in FIGS. 1-3 stores its own captured set of visual information about the same scene in its own pixel array. The three pixel arrays are mutually coincident, and thus form a complete set of pixel triplets, or 3-tuples. The pixels within each triplet may correspond to each other because they are mutually aligned when the three images are aligned. Each one of them may correspond to the same geometric portion of the scene captured by the three digital images. If, for instance, each of the three coincident pixel arrays contains 10 megapixels, then there are 10 million triplets of corresponding pixels from which to generate the new digital image, and each of the 10 million pixel triplets may be individually processed to generate a corresponding single pixel for the new digital image. Each one of the 10 million pixel triplets may be used by itself, without reference to the other pixel triplets, to generate a value for the new pixel in the new digital image that will correspond to that one pixel triplet. In this manner, for a given pixel triplet, derivation of an average color value in a first color space, and subsequent adjustment of the resulting individual color channel values to increase a corresponding color saturation value in a corresponding second color space, does not depend on the other pixel triplets. Color saturation may thus be tailored for each one of the derived new pixels without affecting the other new pixels.

Figure 5:
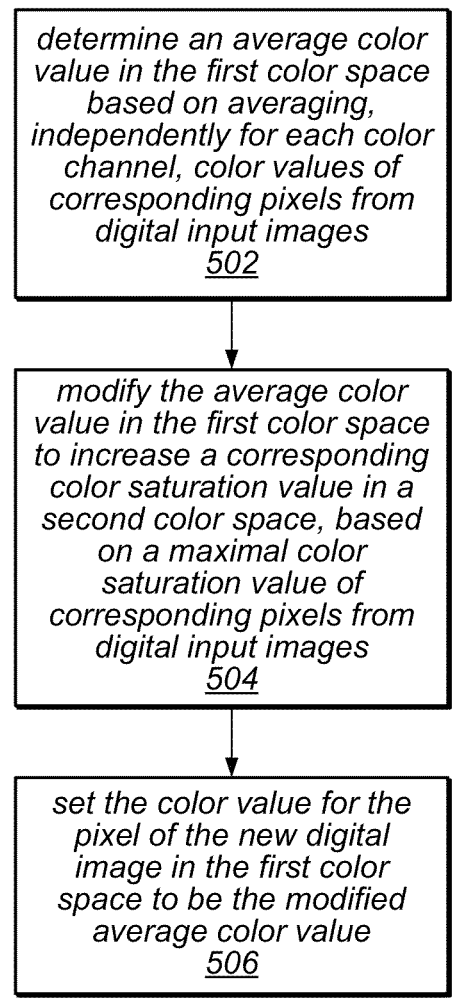
FIG. 5 is a flow diagram illustrating one embodiment of a pixel-by-pixel color saturation-modulated blending technique.

According to various embodiments, FIG. 5 illustrates stages of the pixel-by-pixel color saturation-modulated blending technique for generating a pixel value for one single pixel of the new digital image. The same process may be used to generate a pixel value for each one of the other pixels of the new digital image, too.

In order to calculate a color value in a first color space for a given pixel of the new digital image, an average color value may first be determined (FIG. 5, 502). The derived average color value for the given pixel is a color value within some embodiment of an additive color space, designated herein as a first color space, and including several separate color channels. According to various embodiments, the first color space may be any of several standard red-green-blue (RGB) additive color spaces. Color values for points in some embodiments of RGB additive color spaces may be taken as 3-tuples of the form (r,g,b), where r represents a color coordinate for the red color channel, g represents a color coordinate for the green color channel, and b represents a color coordinate for the blue color channel. The average color value for a given pixel of the new digital image may be determined by averaging, independently for each of the separate color channels of the first color space, color values of those pixels in the corresponding pixel arrays that correspond to the given pixel of the new digital image. For example, an average color value in the first color space may be determined for each given pixel of the new digital image being generated from the three of digital input images shown in FIGS. 1-3. For this example, the first color space may be a standard RGB additive color space. For a given pixel of the new digital image, generating an average color value of the form (r,g,b) in the standard RGB additive color space may require separately averaging the r-coordinates (red coordinate values), g-coordinates (green coordinate values), and b-coordinates (blue coordinate values) found in the triplet of pixels of the three digital input images that correspond to the given pixel of the new digital image. In other words, if the triplet of pixels has values (r1, g1, b1), (r2, g2, b2), and (r3, g3, b3), then the red coordinate for the average color value may be obtained by averaging the three numbers r1, r2, and r3. Similarly, the green coordinate for the average color value may be obtained by averaging the three numbers g1, g2, and g3, and blue coordinate for the average color value may be obtained by averaging the three numbers b1, b2, and b3. If, instead of three digital input images, there were five digital input images, then five red coordinate values would be averaged to get the red coordinate for the average color value, five green coordinate values would be averaged to get the green coordinate for the average color value, and five blue coordinate values would be averaged to get the blue coordinate for the average color value.

According to various embodiments, numerous averaging techniques may be used to determine the average color values for the pixels of the new digital image. For example, for some of the embodiments, each color channel coordinate of the average color value for a given pixel is determined by taking a simple arithmetic mean of the corresponding color channel coordinates of the color values of the pixels in the corresponding pixel arrays that correspond to the given pixel of the new digital image. For example, for the three digital input images shown in FIGS. 1-3, and described in the preceding paragraph, the red coordinate for the average color value may be obtained by adding the three numbers r1, r2, and r3 and then dividing the total by 3. The green and blue coordinates for the average color value may be similarly computed.

A set of digital input images of the same physical scene comprise a corresponding set of pixel arrays which mutually coincide. Thus, if there are n digital input images of the same physical scene, and n corresponding mutually-aligned pixel arrays, then the pixels in the arrays may be grouped into n-tuples of coincident pixels, and each n-tuple of coincident pixels may be used to generate one new pixel for the new digital image. As described in the example above, a simple arithmetic mean function may be applied to each color channel of each n-tuple of coincident pixels in order to generate an average color value in the first color space for the new pixel derived from the n-tuple of coincident pixels. Other averaging functions may be used in various other embodiments. For example, a geometric mean, harmonic mean, weighted mean, midrange, or other averaging function may be applied across the color channel coordinates of each color channel for each individual n-tuple of coincident pixels in order to generate an average color value in the first color space for the new pixel derived from the n-tuple of coincident pixels. In the case of the three digital input images shown in FIGS. 1-3, a geometric mean, harmonic mean, weighted mean, midrange, or other averaging function may be separately applied across the red color channel coordinates, the green channel coordinates, and the blue channel coordinates of each 3-tuple of coincident pixels. In this instance, the 3-tuples of coincident pixels may be represented in the form ((r1, g1,b1), (r2, g2,b2), (r3, g3,b3)), and the red color channel coordinates subjected to an averaging function are r1, r2, and r3. Similarly, the green color channel coordinates, g1, g2, and g3, and the blue color channel coordinates, b1, b2, and b3, are subjected to the same averaging function. This derivation produces a new color value (r,g,b) that is the average color value in the RGB additive color space for the new pixel derived from the 3-tuple of coincident pixels.

As described above, the first color space may be a standard red-green-blue (RGB) additive color space, where color values for pixels may be represented as 3-tuples of the form (r,g,b), with r representing a color coordinate for the red color channel, g representing a color coordinate for the green color channel, and b representing a color coordinate for the blue color channel. According to various embodiments, the second color space may be an HSV (Hue, Saturation, Value) or HSL (Hue, Saturation, Lightness) color space in which the middle component represents a degree of color saturation. Such HSL and HSV color spaces may have a precisely defined relationship with corresponding RGB additive color spaces, so that color values (i.e., points, or tuples) in HSL or HSV color spaces may be readily converted to corresponding color values (points, tuples) in RGB space, and vice versa. Definitions for color saturation in the second color space may vary significantly from one embodiment to the next. For example, standard HSL and HSV color spaces may define substantially different notions of color saturation. The hue components for the HSL and HSV color spaces may, on the other hand, have identical definitions. For a new pixel derived from the digital input images for the new digital image, the average color value in the first color space may correspond to particular color saturation values in other color spaces that have a well-defined relationship to the first color space.

The average color value for a new pixel in the new digital image that is derived from a corresponding n-tuple of coincident pixels gotten from n digital input images of the same physical scene may provide a reasonable representation of hue and brightness for the new pixel, but may not provide adequate or natural color saturation for the new pixel. Some of the n digital input images may be over- or under-exposed to an extent that a color saturation value in a second color space corresponding to the average color value for a new pixel in the first color space is significantly suppressed. Inaccurate representation of a color saturation value corresponding to the average color value for a new pixel, where the average color value is obtained using averaging functions as described above, may need to be corrected. According to various embodiments, color saturation corresponding to the average color value for a new pixel may be modulated in order to restore color saturation lost in the averaging process.

Modulation of color saturation corresponding to the average color value for a new pixel may involve modifying the individual color channel values of the derived average color value in the first color space in order to increase a corresponding color saturation value in a second color space (FIG. 5, 504). Modification of the average color value in the first color space may function to preserve hue ("h" component in HSV color space) and brightness (value, or "v" component in HSV color space) corresponding to the average color value, while at the same time increasing color saturation corresponding to the average color value.

According to various embodiments, modifying the average color value in the first color space in order to increase its corresponding color saturation value in a second color space may be based on the relative magnitudes of certain color saturation values in the second color space (FIG. 5, 504). Those color saturation values in the second color space are obtained for coincident pixels from the pixel arrays of the digital input images. Those color saturation values in the second color space may be examined to determine which ones represent the largest, or maximal, color saturation values, in the second color space, for the whole set of coincident pixels. Based on this determination of a maximal color saturation value in the second color space, the individual color channel values of the derived average color value in the first color space may be modified to increase a corresponding color saturation value in the second color space, relative to the determined maximal color saturation value in the second color space (FIG. 5, 504). The maximal color saturation value in the second color space is determined for a set of coincident pixels from the pixel arrays of the digital input images, that is, for a group of corresponding pixels in the coincident pixel arrays that are used collectively to generate a single new pixel for the new digital image.

Each new pixel in the new digital image may be derived from a group of corresponding pixels in the coincident pixel arrays of the digital input images, where each pixel in the group of corresponding pixels may represent the same geometric portion of the single scene captured by each of the digital input images. As described previously, the correspondence (coincidence, alignment) of pixels in the aligned digital input images gives rise to natural pixel groupings. For example, if n digital input images capture the same physical scene, then they may be aligned one on top of another, and thus account for a collection of n-tuples of pixels each comprising n geometrically aligned pixels. For instance, if the pixel arrays for the n digital input images each contain 10 megapixels, and each 10-megapixel image aligns with all of the other 10-megapixel images, then there are 10 million n-tuples of corresponding pixels, each containing n pixels that coincide when the n digital input images are geometrically aligned.

As discussed above, sometimes several differently-exposed digital images of a single scene may, due to camera movement, or to obscuring debris, or some other anomaly, only partially coincide. For example, if the camera moves slightly between takes of the several digital images, then when the images are physically aligned, the may be a small subset of the pixels in the several images which cannot be aligned. For instance, if n digital input images capturing a single scene each contain 10 megapixels, and 40,000 of those pixels cannot be aligned across all of the n digital input images, the remaining 9,960,000 pixels may still be aligned across all of the n digital input images, thus yielding 9,960,000 n-tuples of coincident pixels. Operations to generate 9,960,000 new pixels for the new digital image may thus proceed using methods described throughout the disclosure.

For embodiments in which n digital input images capture the same physical scene, and for which there are numerous n-tuples of coinciding pixels, each n-tuple of corresponding pixels may be used to generate a new pixel for the new digital image. Each n-tuple may yield an average color value in a first color space for the new pixel, via an averaging function as described above. Each n-tuple may also attain a maximal or largest color saturation value in a second color space that bears a defined relationship to the first color space. For any given n-tuple of aligned pixels taken from the n pixel arrays for the n digital input images, a maximal color saturation value may be obtained by converting the color value of each of the n-tuple's pixels in the first color space to a corresponding color saturation value in the second color space. The resulting collection of color saturation values for the n aligned pixels may then be examined to determine which ones represent the largest, or maximal, color saturation values in the second color space for the whole group of coinciding pixels. Based on this examination, a maximal color saturation value in the second color space is set to a largest one of the resulting collection of color saturation values in the second color space (FIG. 5, 506).

For a variety of embodiments, conversion of a color value in a first color space to a corresponding color saturation value in a second color space may be performed directly, without converting the color value in the first color space to a corresponding full color value in the second color space. For example, if the first color space is a standard RGB additive color space, and the second color space is a standard HSV color space having a defined relationship with the standard RGB additive color space, and (r,g,b) is the color value to be converted, then the corresponding color saturation value in the HSV color space may be calculated as $1-\min\{r,g,b\}/\max\{r,g,b\}$ if $\max\{r,g,b\}$ is not zero, and as zero if $\max\{r,g,b\}$ is zero. There is no need to calculate the hue and value coordinates in the HSV color space in order to obtain the color saturation coordinate. If the second color space is an HSL color space, then a different conversion formula may be used. In general, conversion formulae may vary with the particular embodiments of the first and second color spaces.

For embodiments in which n digital input images capture the same physical scene, and for which there are numerous n-tuples of coinciding pixels, each n-tuple of n corresponding pixels may be used to generate a new pixel for the new digital image. An average color value may be calculated for the n pixels in a first color space, via an averaging function. A maximal color saturation value in a second color space may also be calculated for the n pixels. Both calculations are described in detail in the preceding paragraphs. Subsequent to these two calculations, the individual color channel values of the average color value derived from the color values for the n pixels in the first color space may be modified in order to increase a corresponding color saturation value in a second color space, based on the calculated maximal color saturation value for the n pixels in the second color space.

The modification of the average color value may, for numerous embodiments, be performed in three steps. In the first step, the average color value in the first color space is converted into a corresponding second-color-space color value. For example, if the first color space is embodied as a standard RGB additive color space, and the second color space is embodied as a corresponding standard HSV color space, and the average color value in the RGB color space is represented by the number triple (r,g,b), then a corresponding number triple (h,s,v) in the HSV color space may be calculated using a standard conversion formula. Note that (r,g,b) denotes a point in the RGB color space, and (h,s,v) denotes the corresponding point in HSV color space. According to various embodiments, the goal of the conversion is to explicitly determine the color value (point) in the second color space that corresponds to the average color value (point) in the first color space. Formulae for converting color values in a first color space to color values in a second color space may vary with the various embodiments of the first and second color spaces.

According to certain embodiments, the second step of modifying the average color value includes replacing a color saturation component of the corresponding second-color-space color value with the determined maximal color saturation value. In the example from the preceding paragraph, the middle coordinate of the color value (h,s,v) may be replaced with the determined maximal color saturation value. For instance, if $s_{max}$ denotes the determined maximal color saturation value, then it may replace the number s in the color value (h,s,v) to produce another point in HSV color space, namely $(h,s_{max},v)$. In this example, only the color saturation component is changed. The hue coordinate h and the value coordinate v remain the same, so that when $(h,s_{max},v)$ is converted to a point in RGB color space, the resulting RGB color value appears with the same hue and brightness as the original average color value (r,g,b).

Subsequent to replacing the color saturation component of the corresponding second-color-space color value with the determined maximal color saturation value, the altered corresponding second-color-space color value may be converted back into a first-color-space color value. In the example from the preceding two paragraphs, the point $(h,s_{max},v)$ may be converted from HSV color space back into RGB color space to a corresponding color value (r',g',b'). The original average color value (r,g,b) and its modified counterpart (r',g',b') may present identical hue and brightness, but (r',g',b') corresponds to a color saturation value $s_{max}$, while (r,g,b) corresponds to a color saturation value s. Since the color saturation value $s_{max}$ is a maximal color saturation value in HSV color space for the whole set of coinciding pixels used to determine the average color value (r,g,b) in the first color space, a pixel whose color value is (r',g',b') may have substantially more color saturation than one whose color value is (r,g,b). The increased color saturation gained by shifting from (r,g,b) to (r',g',b') may restore the color saturation lost in the process of averaging the color values of pixels that belong to the group used to generate the corresponding new pixel value for the new digital image. Since the color saturation value $s_{max}$ that corresponds to (r', g',b') is equal to a color saturation value corresponding to at least one of the pixels used in generating the corresponding new pixel color value for the new digital image, it may represent a degree of color saturation that is natural for the newly-derived pixel.

According to other embodiments, the individual color channel values of the derived average color value in the first color space may be altered so that a corresponding color saturation value in the second color space increases, but lies between the color saturation values for two pixels in the group of pixels used to generate the average color value for the new pixel. In these embodiments, color saturation lost in the process of averaging the color values of pixels used to generate the corresponding new pixel value for the new digital image may be restored to represent a natural degree of color saturation for the new pixel. In general, the color saturation associated with the initial average color value for the new pixel is raised dependent on the color saturation values for the pixels used in generating the new pixel color value.

According to various embodiments, the average color value derived for a new pixel of the new digital image is modified in the manner described above to obtain a color saturation-modulated average color value, and the new color value in the first color space for the new pixel becomes the color saturation-modulated average color value (FIG. 5, 506). In this manner, an entire new digital image is obtained as a color saturation-modulated blend of multiple digital input images capturing a single scene.

Figure 6:
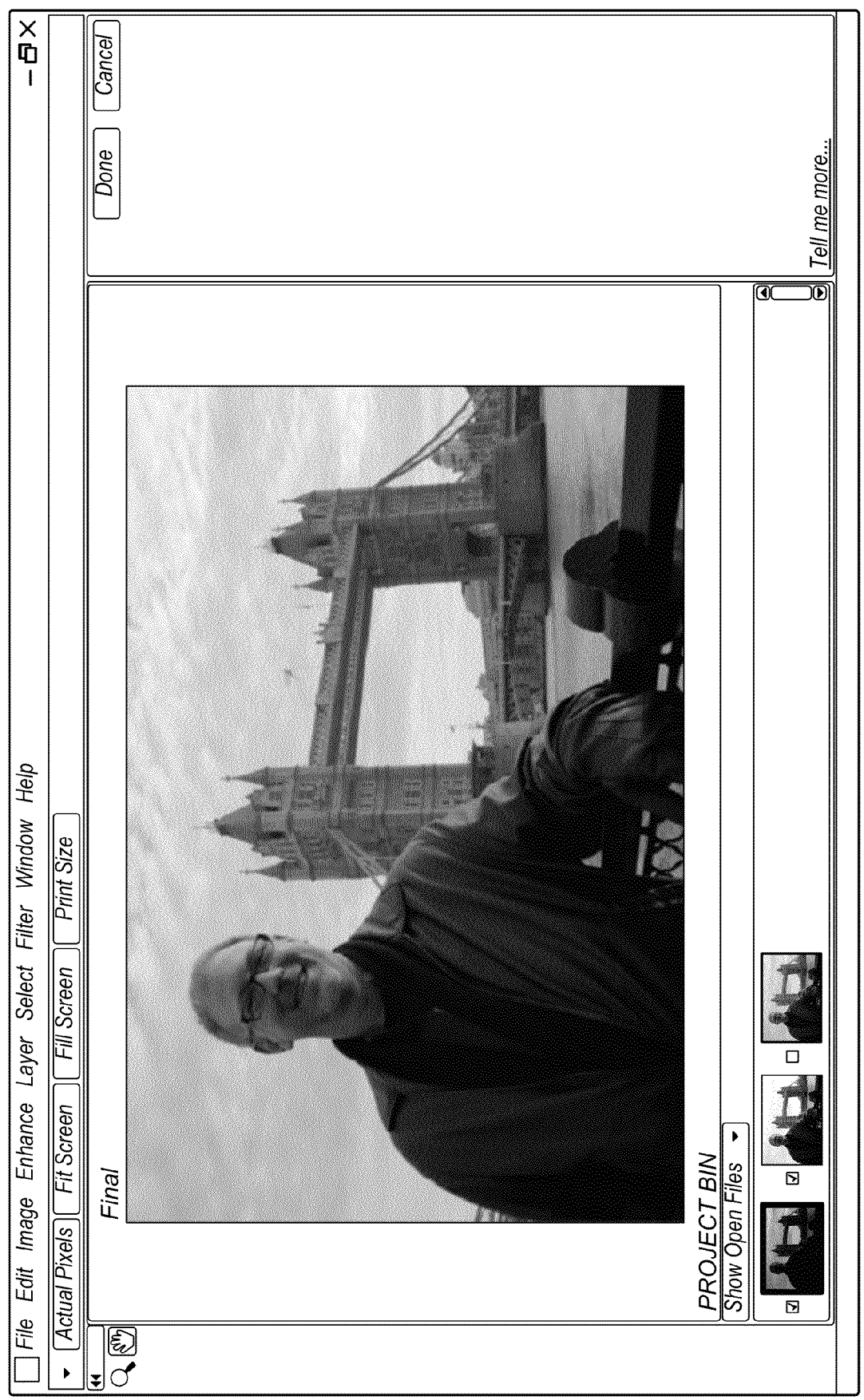
FIGS. 6-9 illustrate one embodiment of a user interface for color saturation-modulated blending of multiple digital input images of the same scene.
Figure 7:
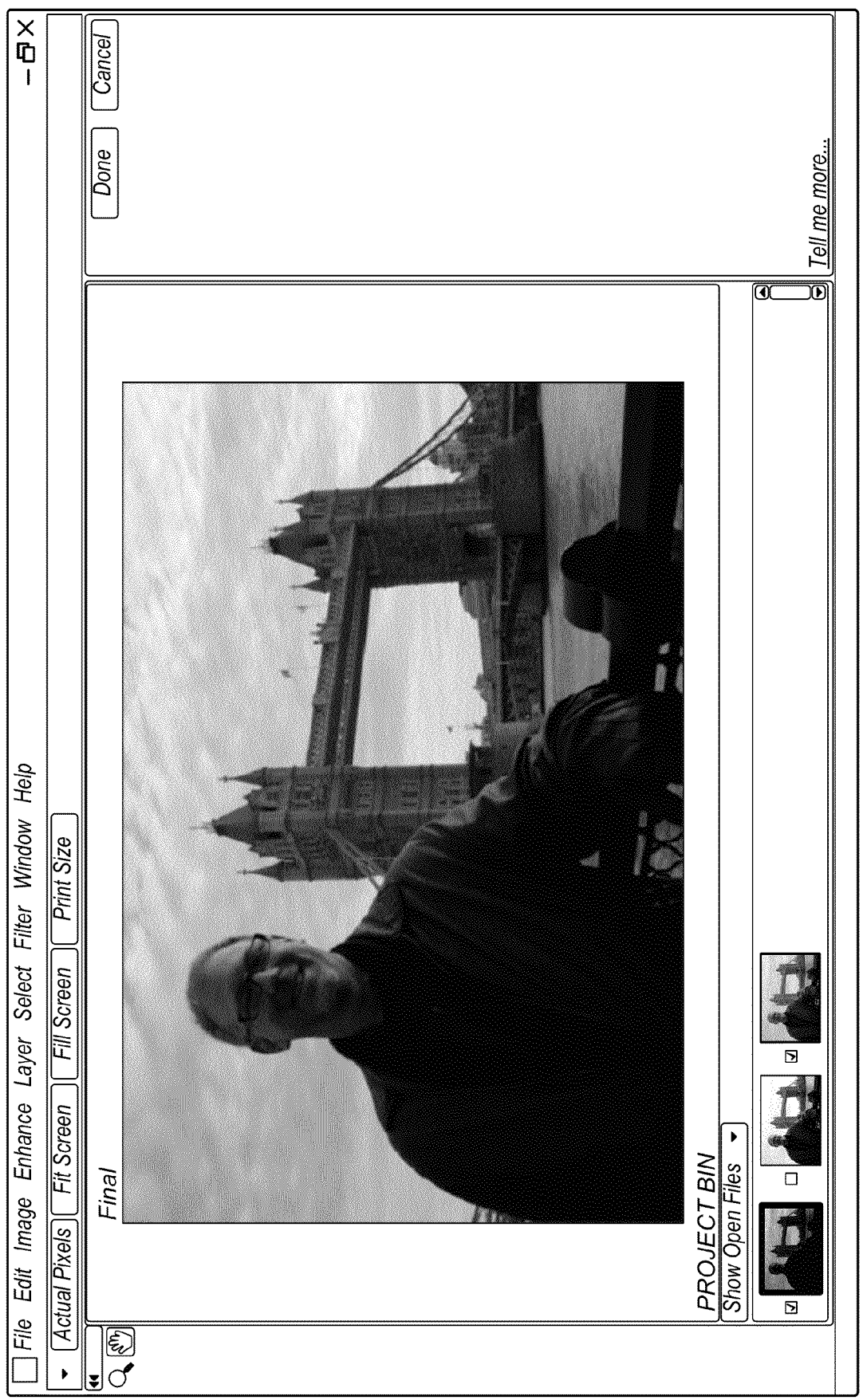
Figure 8:
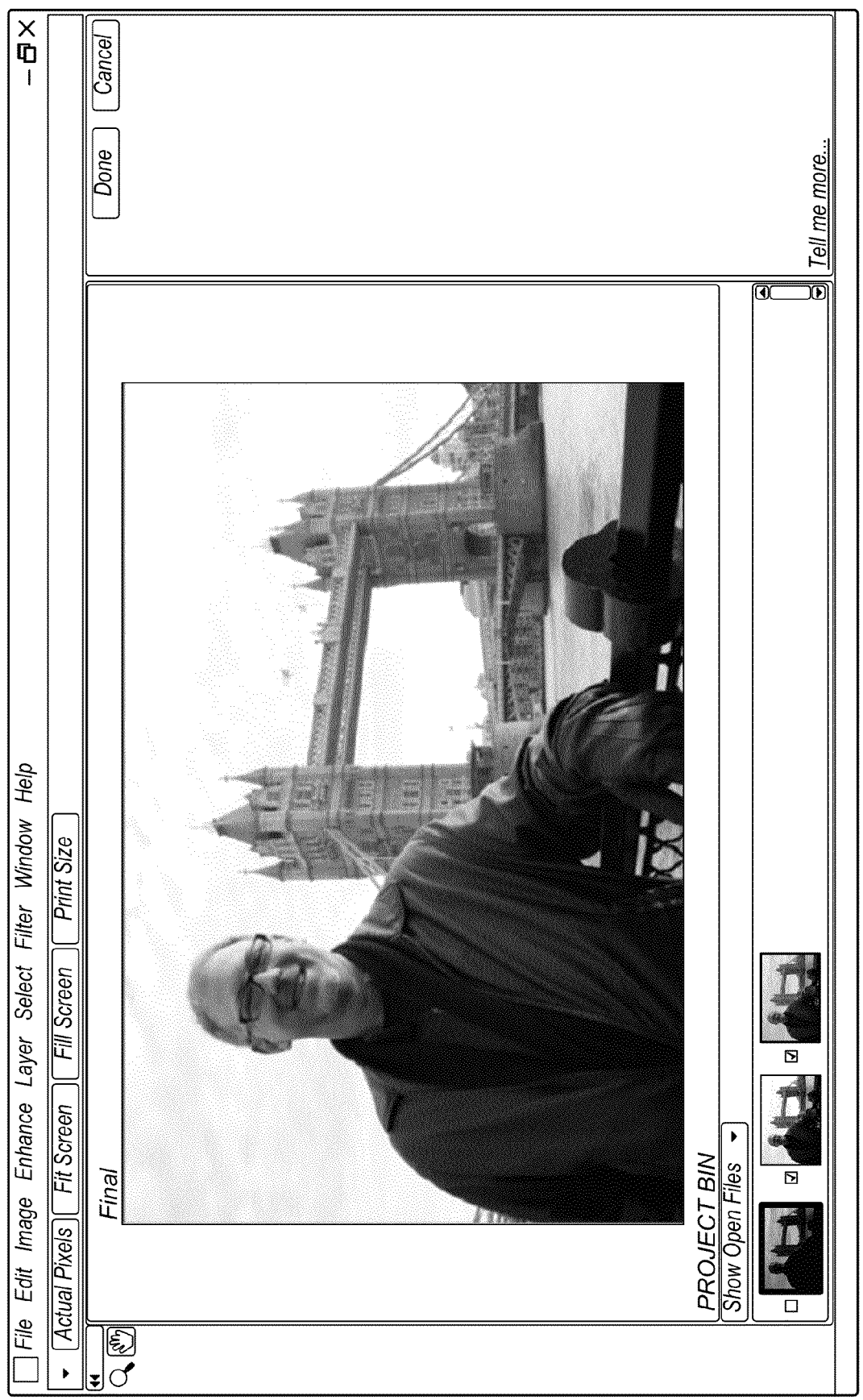
Figure 9:
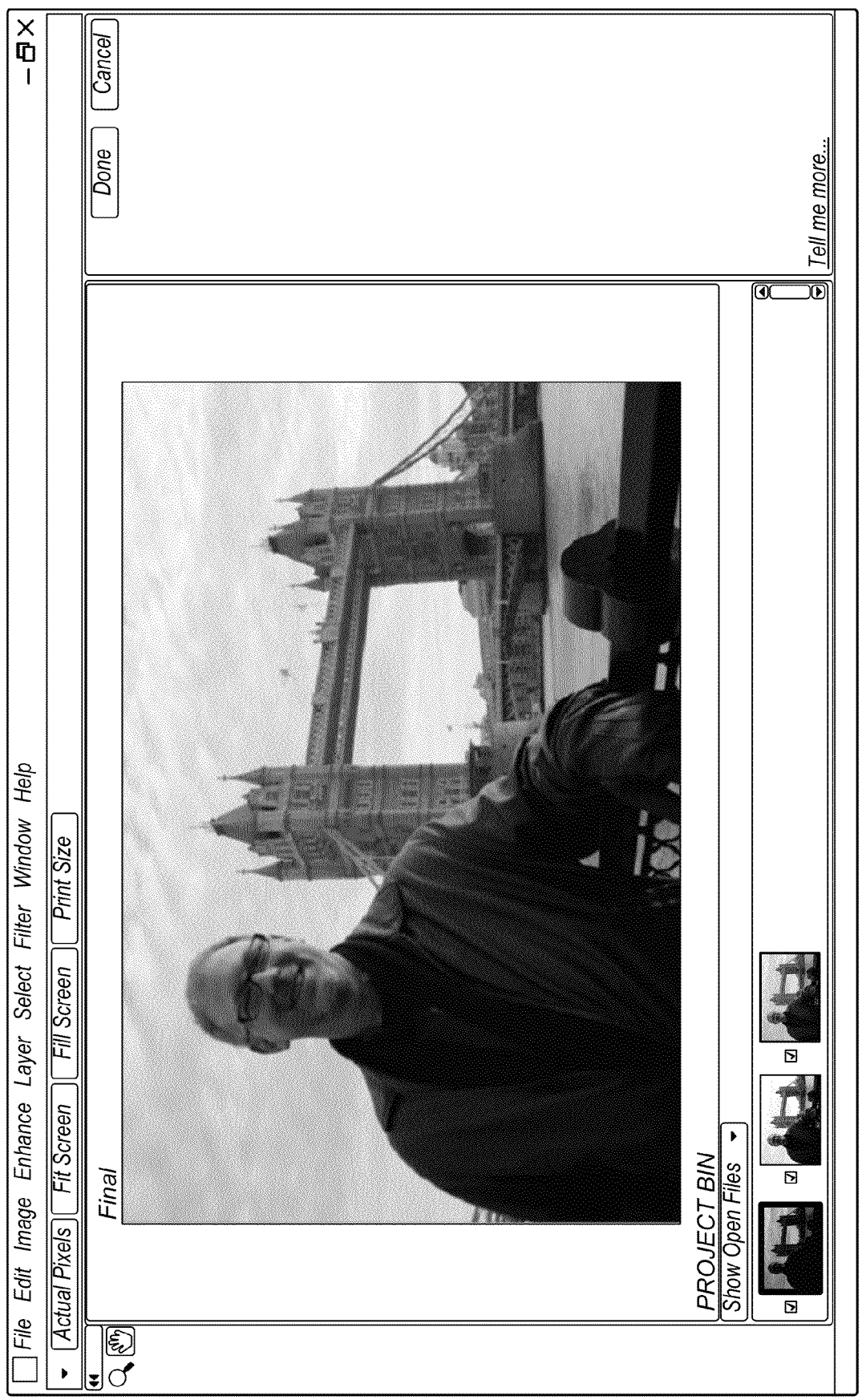

FIGS. 6-9 illustrate one embodiment of a user interface for color saturation-modulated blending of digital input images of the same scene. Each instance of the user interface appearing in FIGS. 6-9 displays three thumbnail representations along its bottom edge. In each instance, the thumbnail images represent the three digital input images illustrated in FIGS. 1-3. The representations of the three digital input images may be independently selected and deselected by checking or unchecking corresponding adjacent tick boxes. In FIG. 6, the first two thumbnails are selected, but the third thumbnail is not. In FIG. 7, the first and third thumbnails are selected, but the second thumbnail is not. In FIG. 8, the second and third thumbnails are selected, but the first thumbnail is not. In FIG. 9, the all three thumbnails are selected. Image blending module 1225 of FIG. 12 may be configured to receive input to select a plurality of the digital input images (FIG. 11, 1102) via the user interface illustrated in FIGS. 6-9, or via any other embodiment of a user interface comprising representations of a plurality of digital input images of the same scene which are independently selectable and deselectable via the user interface.

Figure 11:
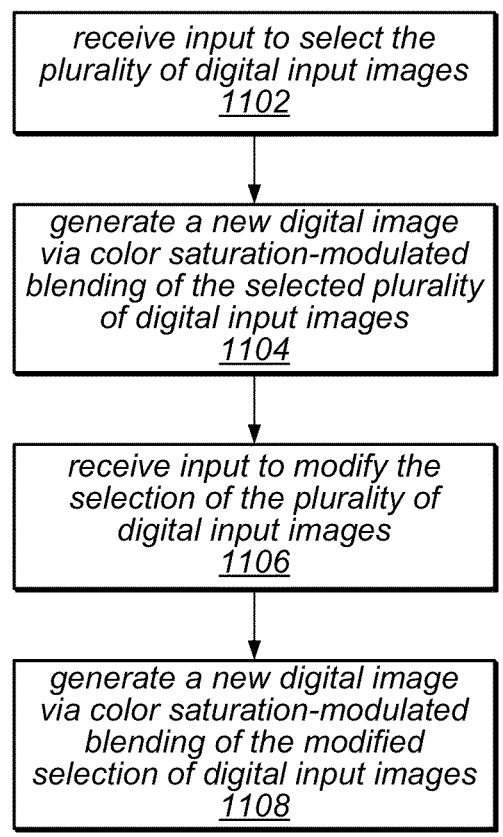
FIG. 11 is a flow diagram illustrating one embodiment of a workflow for color saturation-modulated blending of multiple digital input images of the same scene.

According to numerous embodiments, image blending module 1225 may, in response to receiving input to select a plurality of digital input images, automatically generate a new digital image via color saturation-modulated blending of the selected plurality of digital input images (FIG. 11, 1104). Various embodiments of color saturation-modulated blending of the selected plurality of digital input images may operate as explained in the preceding paragraphs. For the embodiment illustrated in FIG. 6, image blending module 1225 may receive the input selecting the first two thumbnails via the tick boxes adjacent to the thumbnail images in the illustrated user interface. The two selected thumbnail images correspond to two of the three digital input images illustrated in FIGS. 1-3. Upon receiving this selection, image blending module 1225 may automatically generate a new digital output image using methods explained in the foregoing description. The resulting new digital image is a color saturation-modulated blend of the selected pair of digital input images. The user interface shown in FIG. 6 may automatically display the newly-generated digital output image as soon as the new digital image has been generated. The embodiment illustrated in FIG. 6 shows a large representation of the blended image above the row of thumbnail images. According to various embodiments, the blended image may be shown in some other convenient location. For example, the resulting blended image may be displayed in a separate window, or may appear in a window for a different interface, or as a desktop background.

According to numerous embodiments, image blending module 1225 may be configured to continuously perform successive iterations of color saturation-modulated blending of digital input images in response to continued serial modification of an initial selection of several of the digital input images (FIG. 11, 1106). For example, subsequent to the blending of the images selected in FIG. 6, and subsequent to the display of the resultant new digital output image, a user may deselect the second thumbnail image and select the third thumbnail image, as illustrated in FIG. 7. In automatic response to the user's modification of the initial selection of two of the three digital input images, image blending module 1225 may responsively generate a second new digital output image by color saturation-modulated blending of the currently-selected pair of digital input images. In the embodiment illustrated in FIG. 7, the two digital input images that correspond to the first and third thumbnail images are blended to produce a resulting image that is automatically displayed above the row of thumbnails. In similar fashion, a third new digital output image is generated by color saturation-modulated blending of the two images selected in FIG. 8, and the third new digital output image is automatically displayed above the row of thumbnail images. Finally, as illustrated in FIG. 9, all three digital input images are selected subsequent to the display of the third new digital output image in FIG. 8, and in automatic response, a fourth new digital output image is generated by color saturation-modulated blending of the three images selected in FIG. 9. The fourth new digital output image is then automatically displayed above the row of thumbnails images. In general, image blending module 1225 may continue performing successive color saturation-modulated blending of successive selections of digital input images as long as successive selections of the digital input images are being received (FIG. 11, 1108).

At some point in time, a user may, according to some embodiments, choose a favorite one of several new digital output images generated by blending various selections of pluralities of the digital input images. In such instances, a user may decide to activate a "Done" button like the one shown in FIGS. 6-9 in order to indicate a preferred selection of the digital input images. Such indications may be received, according to numerous embodiments, via a great variety of known means for receiving an input signal.

Figure 10:
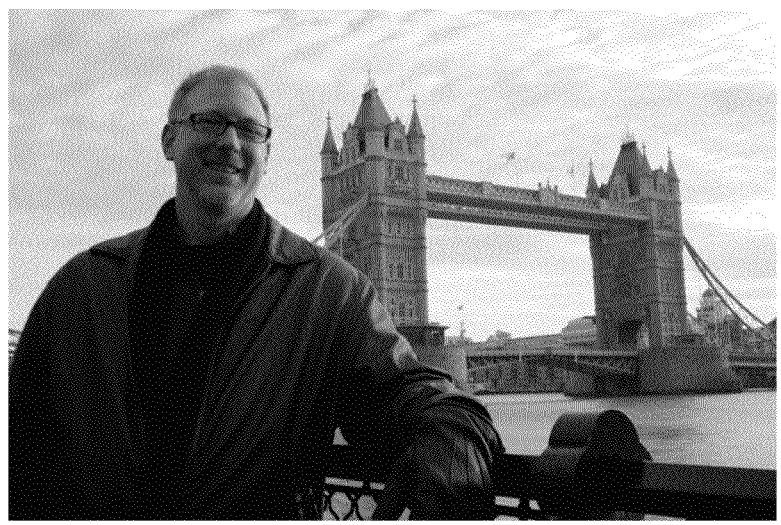
FIG. 10 illustrates an embodiment of a new digital image resulting from color saturation-modulated blending of multiple digital input images of the same scene.

For purposes of speed and efficiency, new output images generated before the user signals a choice of a favorite blended image may have been derived by blending lower-resolution or other representations of the selected original input images that require less computer memory than the original input images themselves. When the user does assert a "Done" signal, or some other similar signal, image blending module 1225 may automatically reblend the favored selected plurality of the digital input images using full-resolution versions of the original input images in order to generate a corresponding full-resolution new digital output image that possesses the maximum information available through color saturation-modulated blending of the favored selection of images. This reblending process may, in some embodiments, occur only when image blending module 1225 receives an input signal to reblend the selected plurality of the digital input images using full-resolution input images. FIG. 10 shows the result of blending all three input images, as indicated by the selection shown in FIG. 9. The new digital output image shown in FIG. 10 is a full-resolution blend of all three digital input images, generated in response to the user's activating the "Done" button shown in FIG. 9.

Figure 12:
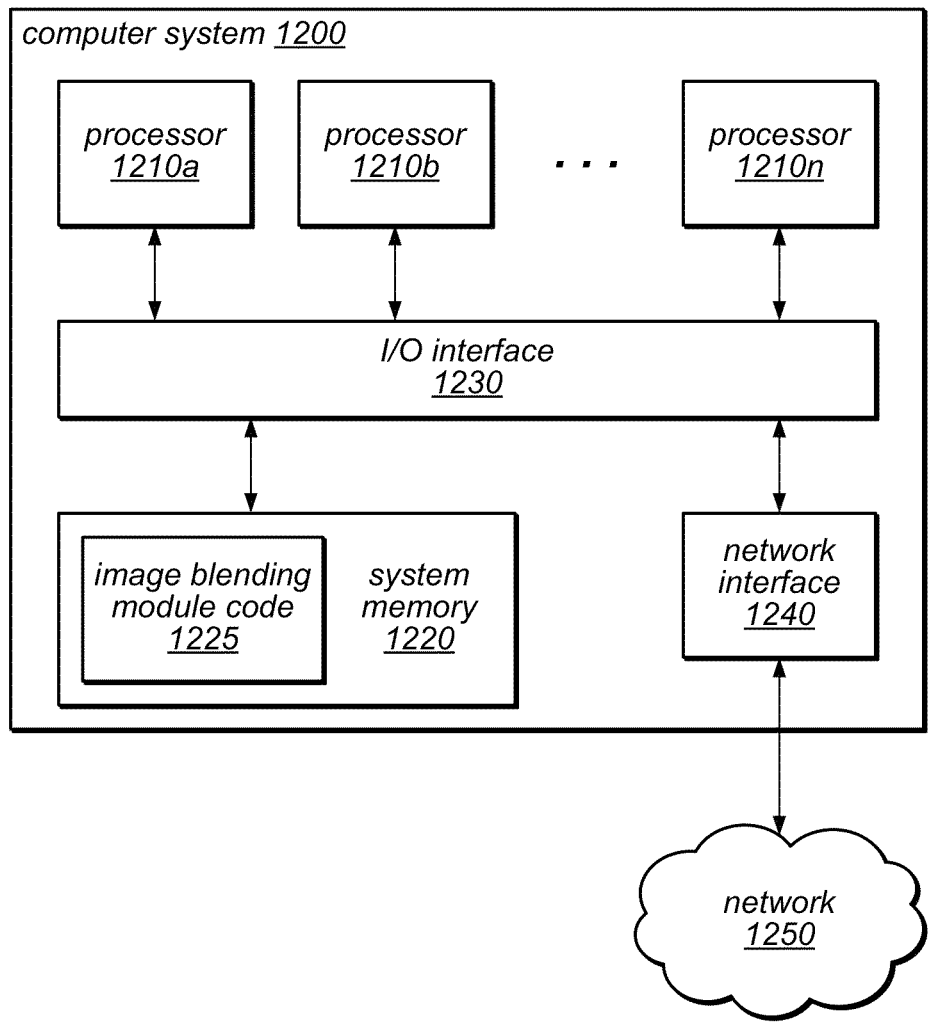
FIG. 12 is a block diagram illustrating an embodiment of a computer system.

FIG. 12 illustrates one embodiment of an architecture that may be configured to implement any or all of the various features of the systems illustrated in FIGS. 1-11. In particular, image blending module 1225 may be configured to perform any or all of the various features of the systems and methods described in the foregoing paragraphs. For example, image blending module 1225 may be configured to receive the plurality of digital input images of the same scene, and to generate new digital images by means of color saturation-modulated blending of selected ones of the digital input images, as described in the foregoing paragraphs. It is noted that across a range of embodiments, functions of image blending module 1225 may be implemented in hardware, in software, or in a combination of software and hardware.

Generally speaking, computer system 1220 illustrated in FIG. 12 may correspond to any suitable type of computer system configured to execute applications. For example, computer system 1220 may correspond to a desktop computer system, a laptop or notebook or netbook computer, a mainframe computer system, a workstation, a network computer, a handheld computing device such as a personal digital assistant, cellular phone, media player, or combination device, a camera, a set top box, a mobile device, a consumer device, a video game console, a handheld video game device, an application server, a storage device, a peripheral device such as a printer, copy machine, switch, modem, or router, or another type of computing or electronic device. In various embodiments, computer system 1220 may include a microprocessing system, storage capacity, input and output systems, and/or networking capability. Storage capacity may be implemented remotely or locally, and may include internal storage or removable media devices. Internal storage may be implemented, for example, using memory, such as random access memory (RAM), mass storage devices such as hard disks, solid-state drives, disk array controllers, or other suitable means. Removable storage media devices may include, for example, compact disc systems, DVD systems, Blu-ray systems, floppy disk drives, Zip drives, USB flash drives, tape drives, or other types of devices. Input systems may include a keyboard, mouse, trackball, joystick, touchpad, touch screen, graphics table stylus, pointing stick, light pen, directional pad, eye tracking device, gesture signaling device, or similar input device, and may also include an image scanner or web cam for image or video input. Output systems may variously include a video subsystem including a video monitor or other display device, an audio subsystem, or other types of output devices. In some embodiments, computer system 1220 may be configured to execute one or more operating systems, such as Microsoft Windows™, Apple MacOS™, Linux™, or any other suitable operating systems.

Exemplary Computer System

It is contemplated that in some embodiments, any of the methods, techniques or components described above may be implemented as instructions and data capable of being stored or conveyed via a computer-accessible medium. Such methods or techniques may include, for example and without limitation, the various methods for receiving a plurality of digital input images of the same scene, and for generating new digital images by means of color saturation-modulated blending of selected ones of the digital input images, as described in the foregoing paragraphs. In particular, image blending module 1225 or any partition of its functions may be implemented as such instructions. Such instructions may be executed to perform a particular computational function, such as generating, sending, or receiving a message, to implement mathematical functions such as integration, differentiation, convolution, etc., as well as to implement higher-order functions such as operating system functioning, network communications functioning, application functioning, and/or any other suitable functions.

One exemplary embodiment of a computer system including tangible, computer-accessible storage media is illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. In different embodiments, system 1200 may be variously configured as a desktop computer system, a laptop or notebook or netbook computer, a mainframe computer system, a workstation, a network computer, a handheld computing device such as a personal digital assistant, cellular phone, media player, or combination device, a camera, a set top box, a mobile device, a consumer device, a video game console, a handheld video game device, an application server, a storage device, a peripheral device such as a printer, copy machine, switch, modem, or router, or another type of computing or electronic device.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 1210 may commonly, but not necessarily, implement the same ISA.

System memory 1220 may be configured to store instructions and data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 1220 as image blending module code 1225. It is noted that in some embodiments, image blending module code 1225 may include instructions and data implementing desired functions that are not directly executable by processor 1210 but are represented or encoded in an abstract form that is translatable to instructions that are directly executable by processor 1210. For example, image blending module code 1225 may include instructions specified in an ISA that may be emulated by processor 1210, or by other code executable on processor 1210. Alternatively, image blending module code 1225 may include instructions, procedures or statements implemented in an abstract programming language that may be compiled or interpreted in the course of execution. As non-limiting examples, image blending module code 1225 may include code specified in a procedural or object-oriented programming language such as C or C++, a scripting language such as Perl or Ruby or Python, a markup language such as HTML or XML, or any other suitable language.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functioning of I/O interface 1230, such as an interface to system memory 1220, may be incorporated directly into processor 1210.

Network interface 1240 may be configured to allow data to be exchanged between computer system 1200 and other devices attached to a network 1250, such as other computer systems or communications devices, for example. In particular, network interface 1240 may be configured to allow communication between computer system 1200 and various external devices. These external devices may include various computing and communications devices, which may include elements similar to those of computer system 1200. In particular, the external devices may include personal computers, telephony devices or network-attached computing devices that users may employ to access network services. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a tangible, computer-accessible storage medium configured to store instructions and data as described above. However, in other embodiments, instructions and/or data may be stored upon and retrieved from different types of computer-accessible storage media. Generally speaking, a computer-accessible medium may include storage media or memory media such as magnetic or optical media, e.g., disk or CD/DVD-ROM coupled to computer system 1200 via I/O interface 1230. A computer-accessible medium may also include any volatile or non-volatile media such as RAM (e.g. SDRAM, DDR SDRAM, RDRAM, SRAM, etc.), ROM, etc, that may be included in some embodiments of computer system 1200 as system memory 1220 or another type of memory. A computer-accessible medium may generally be accessible via transmission media or signals such as electrical, electromagnetic, or digital signals, which may be conveyed via a communication medium such as a network and/or a wireless link, such as may be accessed via network interface 1240.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A method, comprising:
receiving a plurality of digital input images of a same scene, wherein the plurality of digital input images were captured at different exposure settings, and wherein the digital input images comprise corresponding pixel arrays; and
generating a new digital image, wherein said generating comprises calculating, for each pixel of the new digital image, a new color value in a first color space, wherein the first color space comprises separate color channels, and wherein said calculating comprises, for each pixel of the new digital image:
  determining an average color value in the first color space based on averaging, independently for each of the separate color channels, color values of pixels in said corresponding pixel arrays that correspond to the pixel of the new digital image;
  determining a maximal color saturation value, in a second color space, of pixels in said corresponding pixel arrays that correspond to the pixel of the new digital image; and modifying said average color value in the first color space to increase its corresponding color saturation value in the second color space to equal the determined maximal color saturation value, wherein the modified average color value is the new color value in the first color space for the pixel of the new digital image.

2. The method of claim 1, wherein the maximal color saturation value is obtained by:
converting color values in the first color space to color saturation values in the second color space in order to determine a color saturation value in the second color space for each one of the pixels in said corresponding pixel arrays that correspond to the pixel of the new digital image; and
setting the maximal color saturation value to a largest one of the determined color saturation values in the second color space.

3. The method of claim 1, wherein said modifying comprises:
converting said average color value in the first color space into a corresponding second-color-space color value;
replacing a color saturation component of said corresponding second-color-space color value with the maximal color saturation value; and
subsequent to said replacing, converting said corresponding second-color-space color value back into a first-color-space color value.

4. The method of claim 1, wherein the first color space is a standard red-green-blue color space, and the second color space is a standard hue-saturation-value color space that has a defined relationship to the standard red-green-blue color space.

5. The method of claim 1, wherein said generating the new digital image is performed automatically in response to receiving input to select the plurality of digital input images.

6. The method of claim 5, further comprising, subsequent to said generating the new digital image, receiving input to modify the selection of digital input images, and in response, automatically repeating said generating the new digital image using the modified selection of digital input images.

7. The method of claim 5, wherein the input to select the plurality of digital input images is received via a user interface comprising representations of the plurality of digital input images which are independently selectable and deselectable via the user interface, and wherein the new digital image is displayed within the user interface.

8. A system, comprising:
a processor; and
a memory coupled to the processor, wherein the memory stores program instructions executable by the processor to implement an image blending module configured to perform:
receiving a plurality of digital input images of a same scene, wherein the plurality of digital input images were captured at different exposure settings, and wherein the digital input images comprise corresponding pixel arrays; and
generating a new digital image, wherein said generating comprises calculating, for each pixel of the new digital image, a new color value in a first color space, wherein the first color space comprises separate color channels, and wherein said calculating comprises, for each pixel of the new digital image:
determining an average color value in the first color space based on averaging, independently for each of the separate color channels, color values of pixels in said corresponding pixel arrays that correspond to the pixel of the new digital image;
determining a maximal color saturation value, in a second color space, of pixels in said corresponding pixel arrays that correspond to the pixel of the new digital image; and
modifying said average color value in the first color space to increase its corresponding color saturation value in the second color space to equal the determined maximal color saturation value, wherein the modified average color value is the new color value in the first color space for the pixel of the new digital image.

9. The system of claim 8, wherein the image blending module is further configured to obtain the maximal color saturation value by:
converting color values in the first color space to color saturation values in the second color space in order to determine a color saturation value in the second color space for each one of the pixels in said corresponding pixel arrays that correspond to the pixel of the new digital image; and
setting the maximal color saturation value to a largest one of the determined color saturation values in the second color space.

10. The system of claim 8, wherein said modifying comprises:
converting said average color value in the first color space into a corresponding second-color-space color value;
replacing a color saturation component of said corresponding second-color-space color value with the maximal color saturation value; and
subsequent to said replacing, converting said corresponding second-color-space color value back into a first-color-space color value.

11. The system of claim 8, wherein the image blending module performs said generating the new digital image automatically in response to receiving input to select the plurality of digital input images.

12. The system of claim 11, wherein the image blending module is further configured to perform, subsequent to said generating the new digital image, receiving input to modify the selection of digital input images, and in response, automatically repeating said generating the new digital image using the modified selection of digital input images.

13. The system of claim 11, wherein the input to select the plurality of digital input images is received via a user interface comprising representations of the plurality of digital input images which are independently selectable and deselectable via the user interface, and wherein the new digital image is displayed within the user interface.

14. A non-transitory computer-readable storage medium storing program instructions, wherein the program instructions are computer-executable to perform:
receiving a plurality of digital input images of a same scene, wherein the plurality of digital input images were captured at different exposure settings, and wherein the digital input images comprise corresponding pixel arrays; and
generating a new digital image, wherein said generating comprises calculating, for each pixel of the new digital image, a new color value in a first color space, wherein the first color space comprises separate color channels, and wherein said calculating comprises, for each pixel of the new digital image:
determining an average color value in the first color space based on averaging, independently for each of the separate color channels, color values of pixels in said corresponding pixel arrays that correspond to the pixel of the new digital image;

determining a maximal color saturation value, in a second color space, of pixels in said corresponding pixel arrays that correspond to the pixel of the new digital image; and modifying said average color value in the first color space to increase its corresponding color saturation value in the second color space to equal the determined maximal color saturation value, wherein the modified average color value is the new color value in the first color space for the pixel of the new digital image.

15. The non-transitory computer-readable storage medium of claim 14, wherein the program instructions are computer-executable to obtain the maximal color saturation value by:

converting color values in the first color space to color saturation values in the second color space in order to determine a color saturation value in the second color space for each one of the pixels in said corresponding pixel arrays that correspond to the pixel of the new digital image; and setting the maximal color saturation value to a largest one of the determined color saturation values in the second color space.

16. The non-transitory computer-readable storage medium of claim 14, wherein said modifying comprises:

converting said average color value in the first color space into a corresponding second-color-space color value;

replacing a color saturation component of said corresponding second-color-space color value with the maximal color saturation value; and subsequent to said replacing, converting said corresponding second-color-space color value back into a first-color-space color value.

* * * * *